United States Patent
Chen et al.

(10) Patent No.: US 11,226,863 B2
(45) Date of Patent: Jan. 18, 2022

(54) SOLID-STATE DISK AND STARTUP METHOD

(71) Applicant: GIGA-BYTE TECHNOLOGY CO., LTD., New Taipei (TW)

(72) Inventors: Hung-Cheng Chen, New Taipei (TW); Tse-Hsien Liao, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/120,247

(22) Filed: Dec. 13, 2020

(65) Prior Publication Data
US 2021/0303402 A1    Sep. 30, 2021

(30) Foreign Application Priority Data
Mar. 30, 2020 (TW) ................. 109110752

(51) Int. Cl.
| | | |
|---|---|---|
| *G06F 11/14* | (2006.01) | |
| *G06F 11/07* | (2006.01) | |
| *G06F 11/30* | (2006.01) | |
| *G06F 11/34* | (2006.01) | |

(52) U.S. Cl.
CPC ...... *G06F 11/1417* (2013.01); *G06F 11/0727* (2013.01); *G06F 11/3034* (2013.01); *G06F 11/3409* (2013.01)

(58) Field of Classification Search
CPC .............. G06F 11/1417; G06F 11/142; G06F 11/3485; G06F 11/3034; G06F 11/0727; G06F 11/3409; G06F 9/441; G06F 9/4408
See application file for complete search history.

(56) References Cited

U.S. PATENT DOCUMENTS

| | | | |
|---|---|---|---|
| 2002/0041665 A1 | 4/2002 | Meyer et al. | |
| 2006/0155979 A1* | 7/2006 | Blinick | G06F 11/1417 713/2 |
| 2007/0136502 A1* | 6/2007 | Wen | G06F 13/4291 710/110 |
| 2010/0185846 A1* | 7/2010 | Fukase | G06F 11/1417 713/2 |
| 2010/0281297 A1* | 11/2010 | Jibbe | G06F 11/1417 714/6.12 |

(Continued)

FOREIGN PATENT DOCUMENTS

WO    2019050581    3/2019

OTHER PUBLICATIONS

"Search Report of Europe Counterpart Application", dated Jun. 10, 2021, p. 1-p. 7.

*Primary Examiner* — Yolanda L Wilson
(74) *Attorney, Agent, or Firm* — JCIPRNET

(57) ABSTRACT

A solid-state disk and a startup method are provided. The solid-state disk includes a control circuit, a firmware switching circuit, a first firmware storage unit, and a second firmware storage unit. The firmware switching circuit is coupled to the control circuit. The first firmware storage unit is coupled to the firmware switching circuit and stores a first firmware. The second firmware storage unit is coupled to the firmware switching circuit and stores a second firmware. The control circuit reads the first firmware storage unit or the second firmware storage unit according to whether the firmware switching circuit is triggered so as to startup according to the first firmware or the second firmware.

10 Claims, 3 Drawing Sheets

(56) References Cited

U.S. PATENT DOCUMENTS

| | | | |
|---|---|---|---|
| 2012/0005468 A1* | 1/2012 | Yu | G06F 1/3275 |
| | | | 713/2 |
| 2016/0055113 A1* | 2/2016 | Hodge | G06F 21/575 |
| | | | 710/308 |
| 2018/0024763 A1* | 1/2018 | Kodera | G06F 12/1425 |
| | | | 711/163 |
| 2019/0073268 A1* | 3/2019 | Kantor | G06F 11/1433 |

* cited by examiner

SOLID-STATE DISK AND STARTUP METHOD

CROSS-REFERENCE TO RELATED APPLICATION

This application claims the priority benefit of Taiwan application serial no. 109110752, filed on Mar. 30, 2020. The entirety of the above-mentioned patent application is hereby incorporated by reference herein and made a part of this specification.

BACKGROUND

Field of the Disclosure

The disclosure relates to a disk startup technology, and particularly relates to a solid-state disk and a startup method.

Description of Related Art

For a general solid-state disk, the firmware of the solid-state disk may be updated, for example, to the firmware data of a newer firmware version provided by the disk manufacturer. However, when the firmware update fails, the normal solid-state disk will not be able to perform normal startup operations because it cannot read valid firmware data, and the user may have to send the solid-state disk to the manufacturer to reprogram the firmware storage unit so that the solid-state disk can perform operation again. In view of this, when the solid-state disk fails to update the firmware and the solid-state disk cannot perform startup operation based on the firmware with update failure, to effectively overcome the problem, the disclosure provides some embodiments of solutions as follows.

SUMMARY OF THE DISCLOSURE

The disclosure provides a solid-state disk and a startup method, which can effectively perform the startup operation of the control circuit of the solid-state disk.

In the disclosure, the solid-state disk includes a control circuit, a firmware switching circuit, a first firmware storage unit, and a second firmware storage unit. The firmware switching circuit is coupled to the control circuit. The first firmware storage unit is coupled to the firmware switching circuit and stores a first firmware. The second firmware storage unit is coupled to the firmware switching circuit and stores a second firmware. The control circuit reads the first firmware storage unit or the second firmware storage unit according to whether the firmware switching circuit is triggered so as to startup according to the first firmware or the second firmware.

The startup method of the disclosure is adaptable for a solid-state disk. The solid-state disk includes a control circuit, a firmware switching circuit, a first firmware storage unit, and a second firmware storage unit. The startup method includes: reading the first firmware stored in the first firmware storage unit or the second firmware stored in the second firmware storage unit by the control circuit according to whether the firmware switching circuit is triggered; starting up by the control circuit according to the first firmware or the second firmware.

Based on the above, through the solid-state disk and the startup method of the disclosure, two firmwares can be stored in two firmware storage units for the control circuit to read selectively, so that the solid-state disk can be started up.

In order to make the above-mentioned features and advantages of the disclosure more comprehensible, the embodiments are specifically described below in detail with reference to the accompanying drawings.

DESCRIPTION OF EMBODIMENTS

Figure 1:
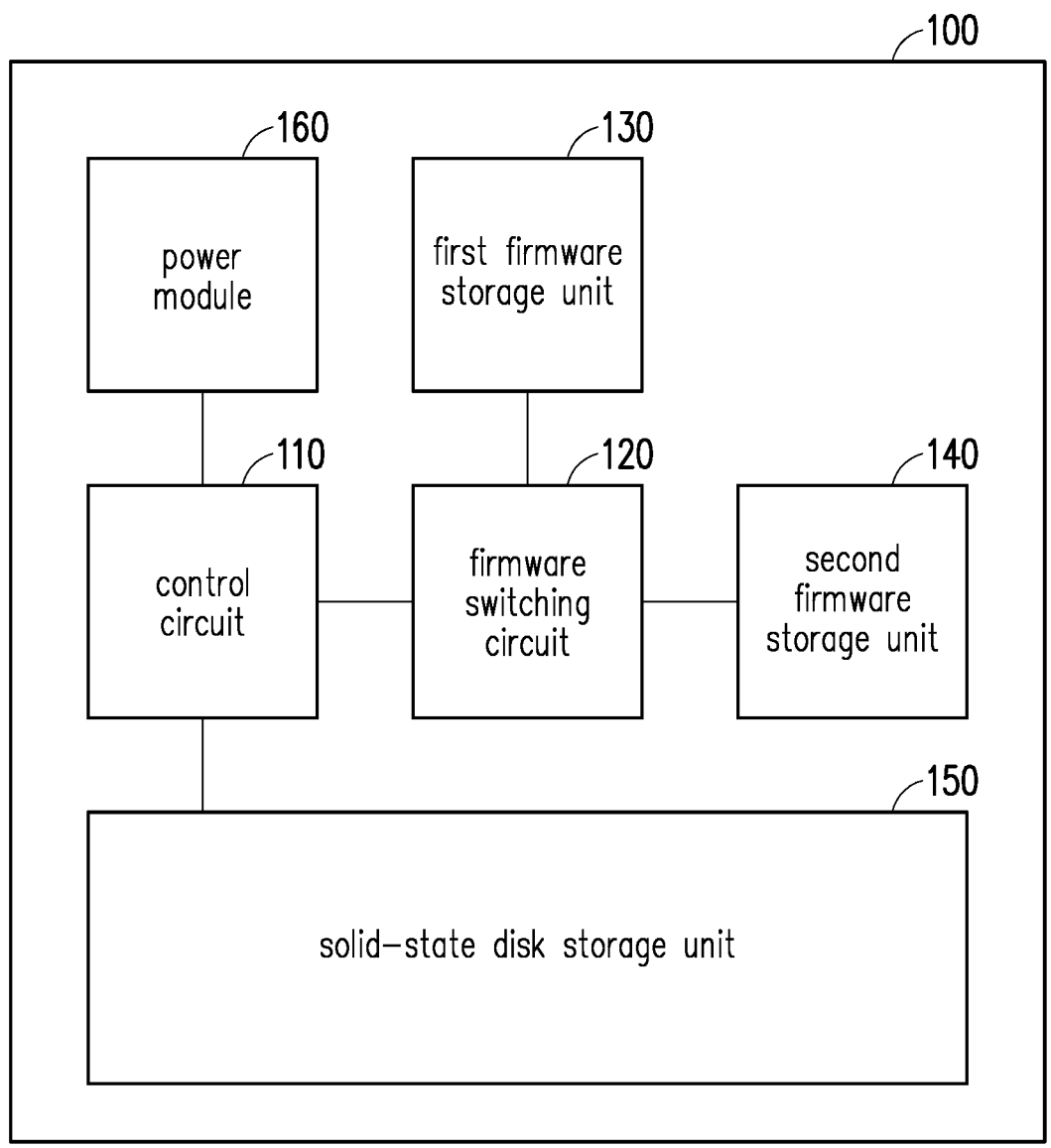
FIG. 1 is a schematic block diagram of a solid-state disk according to an embodiment of the disclosure.

In order to make the content of this disclosure to be more comprehensible, the following embodiments are specifically cited as examples based on which this disclosure can indeed be implemented. In addition, wherever possible, elements/components/steps with the same reference numbers in the drawings and embodiments represent the same or similar components.

FIG. 1 is a schematic block diagram of a solid-state disk according to an embodiment of the disclosure. Referring to FIG. 1, a solid-state disk 100 includes a control circuit 110, a firmware switching circuit 120, a first firmware storage unit 130, a second firmware storage unit 140, a solid-state disk storage unit 150, and a power module 160. The control circuit 110 is coupled to the firmware switching circuit 120, the solid-state disk storage unit 150 and the power module 160. The firmware switching circuit 120 is further coupled to the first firmware storage unit 130 and the second firmware storage unit 140. In this embodiment, the first firmware storage unit 130 is configured to store the first firmware. The second firmware storage unit 140 is configured to store the second firmware. The control circuit 110 is configured to read the first firmware storage unit 130 or the second firmware storage unit 140 according to whether the firmware switching circuit 120 is triggered so as to startup according to the first firmware or the second firmware.

For example, the second firmware storage unit 140 can be configured to store backup firmware. When the solid-state disk 100 is updating the firmware, the control circuit 110 can update the first firmware stored in the first firmware storage unit 130. However, when the control circuit 110 is started up after the firmware update of the first firmware storage unit 130 is completed, if the control circuit 110 reads the first firmware stored in the first firmware storage unit 130 to perform the startup operation and the operation fails, the firmware switching circuit 120 will be triggered. Therefore, when the control circuit 110 restarts, the control circuit 110 will read the second firmware stored in the second firmware storage unit 140 through the triggered firmware switching circuit 120 to restart. In other words, the solid-state disk 100 of the embodiment can effectively overcome the problem that the solid-state disk 100 cannot function when the control circuit 110 cannot perform the startup operation based on the firmware that fails to be updated when the solid-state disk 100 encounters firmware update failure.

However, the disclosure is not limited to the above application examples. In other application examples, the first firmware stored in the first firmware storage unit 130 and the second firmware stored in the second firmware storage unit 140 can be respectively executed by the control circuit to achieve different access performance or different levels of energy saving. The control circuit 110 of the solid-state disk 100 can selectively trigger the firmware switching circuit 120 according to the following factors such as the operating performance of the central processing unit (CPU), the power supply status of the power module 160, or the ambient temperature, etc., so as to selectively read the first firmware stored in the first firmware storage unit 130 or the second firmware stored in the second firmware storage unit 140 to perform the startup operation according to the trigger result of the firmware switching circuit 120. Or, in another application example, the first firmware stored in the first firmware storage unit 130 and the second firmware stored in the second firmware storage unit 140 may be different firmware versions, and solid-state disk 100 can trigger the firmware switching circuit 120 through manual switching by the user, so that the control circuit 110 of the solid-state disk 100 can selectively read the first firmware stored in the first firmware storage unit 130 or the second firmware stored in the second firmware storage unit 140 to perform the startup operation.

Figure 2:
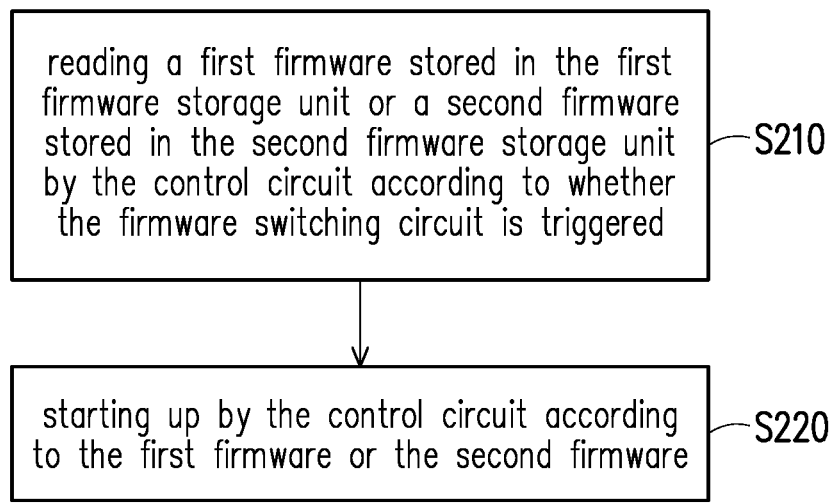
FIG. 2 is a flowchart of a startup method according to an embodiment of the disclosure.

FIG. 2 is a flowchart of a startup method according to an embodiment of the disclosure. Referring to FIG. 1 and FIG. 2, the startup method of this embodiment can be at least adapted to the solid-state disk 100 in FIG. 1. In step S210, the control circuit 110 reads the first firmware stored in the first firmware storage unit 130 or the second firmware stored in the second firmware storage unit 140 according to whether the firmware switching circuit 120 is triggered. In step S220, the control circuit 110 is started up according to the first firmware or the second firmware. Therefore, the startup method of this embodiment can enable the solid-state disk 100 to effectively perform the startup operation of the control circuit 110. In addition, regarding other device features, implementation examples, and technical details of the solid-state disk 100 of this embodiment, sufficient teachings, suggestions, and implementation descriptions can be derived from the embodiment of FIG. 1, and no further details are narrated herein.

Figure 3:
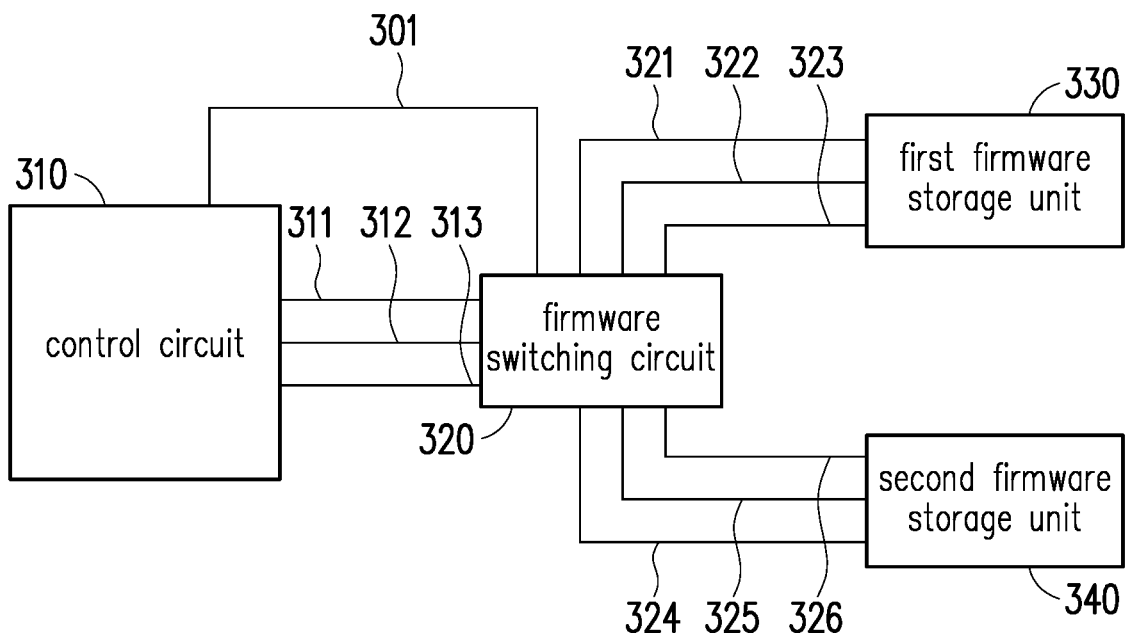
FIG. 3 is a schematic circuit diagram of a switching circuit according to an embodiment of the disclosure.

FIG. 3 is a schematic circuit diagram of a switching circuit according to an embodiment of the disclosure. Referring to FIG. 3, the switching circuit of the solid-state disk of the disclosure can be as shown in FIG. 3. The multiple pins of the control circuit 310 can be electrically connected to the firmware switching circuit 320 through lines 311 to 313, wherein the multiple pins can include chip selection (CS) pins, write protection (WP) pins, and hold pins. The firmware switching circuit 320 switches the above-mentioned multiple pins of the control circuit 310 respectively to be coupled to the first firmware storage unit 330 or the second firmware storage unit 340 through the lines 321 to 323 and the lines 324 to 326 respectively. It is worth noting that an additional trace 301 can be electrically connected between the control circuit 310 and the firmware switching circuit 320 of this embodiment. When the control circuit 310 encounters the situation described in the above example or other situations, the control circuit 310 can provide a trigger signal to the firmware switching circuit 320 through the trace 301 to trigger the firmware switching circuit 320.

In other words, before the firmware switching circuit 320 is triggered, the control circuit 310 accesses the first firmware stored in the first firmware storage unit 330 through the firmware switching circuit 320. Moreover, after the firmware switching circuit 320 is triggered, the control circuit 310 accesses the second firmware stored in the second firmware storage unit 340 through the firmware switching circuit 320. However, it is not limited that the firmware switching circuit 320 receives the trigger signal from the control circuit 310 only through the trace 301. In another embodiment, the firmware switching circuit 320 can also be connected to a trigger unit manually triggered by the user through another additional trace, so as to receive another trigger signal generated by the user's trigger to determine the object to be accessed by the control circuit 310.

Figure 4:
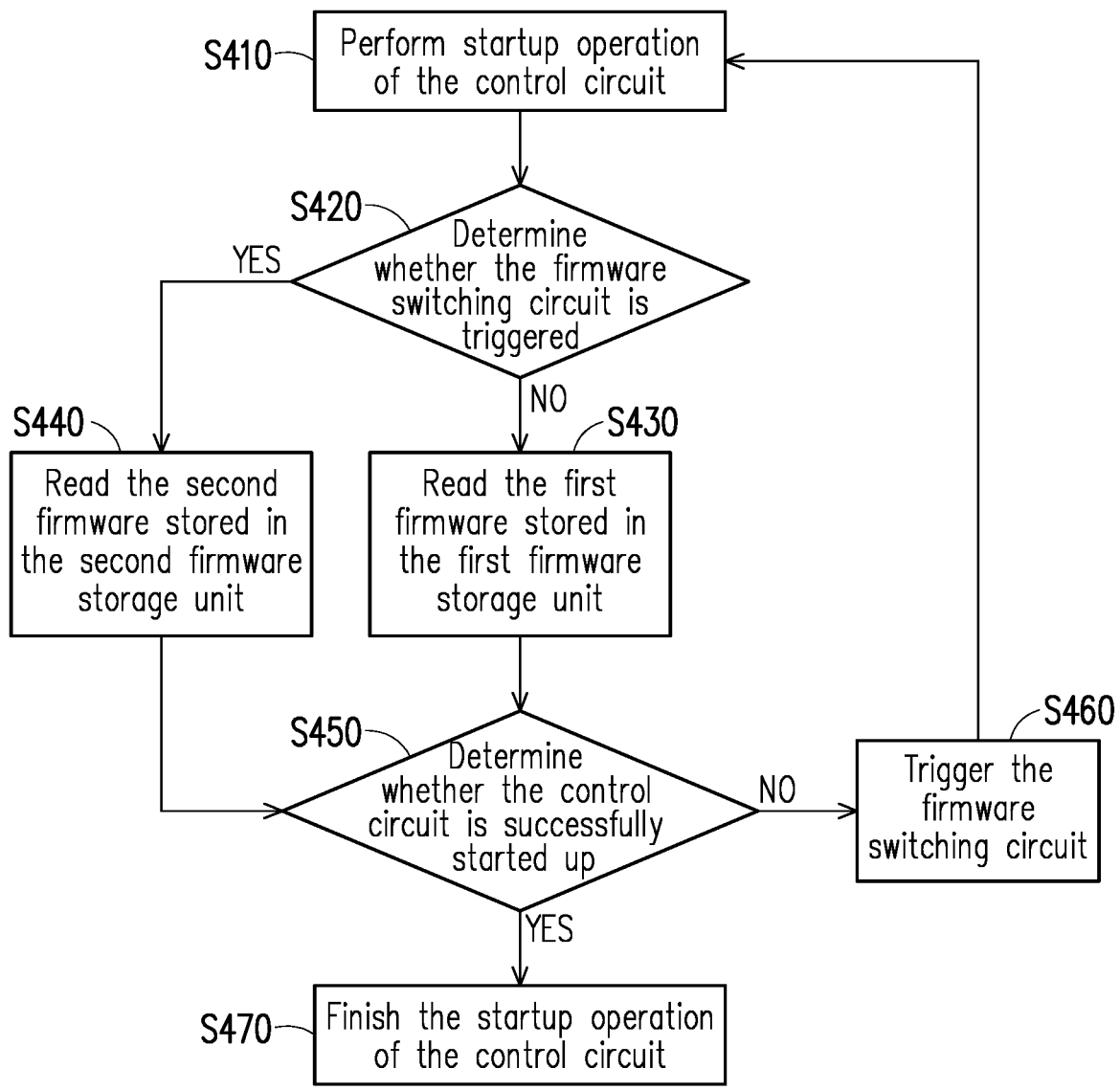
FIG. 4 is a flowchart of a startup method according to another embodiment of the disclosure.

FIG. 4 is a flowchart of a startup method according to another embodiment of the disclosure. Referring to FIG. 1 and FIG. 4, the startup method of this embodiment is at least adaptable for the solid-state disk 100 of FIG. 1. In step S410, the control circuit 110 performs a startup operation. The control circuit 110 determines whether the firmware switching circuit 120 is triggered. If not, the solid-state disk 100 executes step S430. In step S430, the control circuit 110 reads the first firmware stored in the first firmware storage unit 130 through the firmware switching circuit 120. The control circuit 110 executes the first firmware to perform a startup operation. In step S450, the control circuit 110 determines whether the startup operation is successful. If yes, the solid-state disk 100 executes step S470. In step S470, the control circuit 110 ends the startup operation. However, if not, the solid-state disk 100 executes step S460.

In step S460, the control circuit 110 triggers the firmware switching circuit 120. Then, the control circuit 110 executes step S410 again to restart. When the control circuit 110 performs step S420 again, because the control circuit 110 determines that the firmware switching circuit 120 is triggered, the control circuit 110 executes step S440. In step S440, the control circuit 110 reads the second firmware stored in the second firmware storage unit 140 through the firmware switching circuit 120. The control circuit 110 executes the second firmware to perform the startup operation again, and the control circuit 110 continues to execute step S450 and step S470. Therefore, the startup method of this embodiment can enable the solid-state disk 100 to effectively perform the startup operation of the control circuit 110. In addition, regarding other device features, implementation examples, and technical details of the solid-state disk 100 of this embodiment, sufficient teachings, suggestions, and implementation descriptions can be derived from the embodiment of FIG. 1, and no further details are narrated herein.

In summary, through the solid-state disk and the startup method of the disclosure, two firmwares can be stored in two firmware storage units, and a firmware switching circuit is arranged between the control circuit and the two firmware storage units, so as to determine that the control circuit accesses the firmware of the solid-state disk from one of the two firmware storage units according to whether the firmware switching circuit is triggered. Moreover, the trigger mode of the firmware switching circuit can be automatic or manual. Accordingly, the solid-state disk and the startup method of the disclosure can provide the function of being able to read the effective firmware of the solid-state disk for startup operation, or may provide the function of being able to selectively read the specific firmware for special startup operation.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A solid-state disk, comprising:
   a control circuit;

a firmware switching circuit, coupled to the control circuit;
a first firmware storage circuit, coupled to the firmware switching circuit, and configured to store a first firmware; and
a second firmware storage circuit, coupled to the firmware switching circuit, and configured to store a second firmware,
wherein the control circuit is configured to read the first firmware storage circuit or the second firmware storage circuit according to whether the firmware switching circuit is triggered so as to startup according to the first firmware or the second firmware,
wherein the control circuit is preset to read the first firmware of the first firmware storage circuit to startup according to the first firmware, and when the control circuit fails to startup the solid-state disk according to the first firmware, the firmware switching circuit is triggered to switch the control circuit to read the second firmware of the second firmware storage circuit, and the control circuit starts up again according to the second firmware,
wherein when the control circuit fails to startup the solid-state disk, the control circuit outputs a trigger signal to the firmware switching circuit through a trace coupled to the firmware switching circuit to trigger the firmware switching circuit to switch the control circuit to read the first firmware storage circuit or the second firmware storage circuit.

2. The solid-state disk according to claim 1, wherein the firmware switching circuit receives a trigger signal externally to trigger the firmware switching circuit to switch the control circuit to read the first firmware storage circuit or the second firmware storage circuit.

3. The solid-state disk according to claim 1, wherein the first firmware and the second firmware are respectively executed by the control circuit to achieve different access performance or different levels of energy saving.

4. The solid-state disk according to claim 1, wherein the first firmware and the second firmware are different firmware versions.

5. The solid-state disk according to claim 1, wherein the firmware switching circuit is configured to switch a plurality of pins of the control circuit to be coupled to the first firmware storage circuit or the second firmware storage circuit, wherein the plurality of pins comprises a chip selection pin, a write protection pin and a hold pin.

6. A startup method, adaptable for a solid-state disk, wherein the solid-state disk comprises a control circuit, a firmware switching circuit, a first firmware storage circuit and a second firmware storage circuit, and the startup method comprising:
reading a first firmware stored in the first firmware storage circuit or a second firmware stored in the second firmware storage circuit by the control circuit according to whether the firmware switching circuit is triggered; and
starting up by the control circuit according to the first firmware or the second firmware,
wherein a step of reading the first firmware stored in the first firmware storage circuit or the second firmware stored in the second firmware storage circuit by the control circuit according to whether the firmware switching circuit is triggered comprises:
reading the first firmware of the first firmware storage circuit by the control circuit that is preset to startup the solid-state disk according to the first firmware; and
when the control circuit fails to startup the solid-state disk according to the first firmware, the firmware switching circuit is triggered to switch the control circuit to read the second firmware of the second firmware storage circuit, and to startup again according to the second firmware,
wherein when the control circuit fails to startup the solid-state disk according to the first firmware, a step of triggering the firmware switching circuit to switch the control circuit to read the second firmware of the second firmware storage circuit, and to startup again according to the second firmware comprises:
outputting, by the control circuit, a trigger signal to the firmware switching circuit through a trace coupled to the firmware switching circuit to trigger the firmware switching circuit to switch the control circuit to read the second firmware storage circuit.

7. The startup method according to claim 6, wherein a step of reading the first firmware stored in the first firmware storage circuit or the second firmware stored in the second firmware storage circuit by the control circuit according to whether the firmware switching circuit is triggered comprises:
receiving, by the firmware switching circuit, a trigger signal externally to trigger the firmware switching circuit to switch the control circuit to read the first firmware storage circuit or the second firmware storage circuit.

8. The startup method according to claim 6, wherein the first firmware and the second firmware are respectively executed by the control circuit to achieve different access performance or different levels of energy saving.

9. The startup method according to claim 6, wherein the first firmware and the second firmware are different firmware versions.

10. The startup method according to claim 6, wherein the firmware switching circuit is configured to switch a plurality of pins of the control circuit to be coupled to the first firmware storage circuit or the second firmware storage circuit, wherein the plurality of pins comprises a chip selection pin, a write protection pin and a hold pin.

* * * * *